(12) United States Patent
Gore

(10) Patent No.: US 8,015,022 B2
(45) Date of Patent: Sep. 6, 2011

(54) SYSTEM AND METHOD OF MANAGING ABSENTEEISM IN AN ORGANIZATION

(75) Inventor: Adrian Gore, Gauteng (ZA)

(73) Assignee: Discovery Holdings Limited, Sandton (ZA)

( * ) Notice: Subject to any disclaimer, the term of this patent is extended or adjusted under 35 U.S.C. 154(b) by 1001 days.

(21) Appl. No.: 11/715,181

(22) Filed: Mar. 7, 2007

(65) Prior Publication Data

US 2007/0233512 A1      Oct. 4, 2007

(30) Foreign Application Priority Data

Mar. 7, 2006   (ZA) .................................. 2006/01934

(51) Int. Cl.
*G06F 17/60* (2006.01)
*G06Q 10/10* (2006.01)

(52) U.S. Cl. ............ 705/1.1; 705/2; 705/14; 705/14.19; 705/14.25; 705/14.27

(58) Field of Classification Search .................. None
See application file for complete search history.

(56) References Cited

U.S. PATENT DOCUMENTS

| | | | | |
|---|---|---|---|---|
| 6,010,452 | A * | 1/2000 | Harcourt | 600/300 |
| 6,151,586 | A * | 11/2000 | Brown | 705/14 |
| 7,630,937 | B1 | 12/2009 | Mo | |
| 7,797,175 | B2 | 9/2010 | Luedtke | |
| 2002/0111827 | A1 * | 8/2002 | Levin et al. | 705/2 |
| 2002/0184129 | A1 | 12/2002 | Arena | |
| 2003/0149596 | A1 * | 8/2003 | Bost | 705/2 |
| 2003/0200142 | A1 * | 10/2003 | Hicks et al. | 705/14 |
| 2003/0208385 | A1 | 11/2003 | Zander | |
| 2005/0038679 | A1 * | 2/2005 | Short | 705/2 |
| 2005/0288971 | A1 | 12/2005 | Cassandra | |
| 2006/0111944 | A1 * | 5/2006 | Sirmans et al. | 705/3 |
| 2006/0129436 | A1 * | 6/2006 | Short | 705/4 |
| 2007/0233512 | A1 * | 10/2007 | Gore | 705/1 |
| 2008/0197185 | A1 * | 8/2008 | Cronin et al. | 235/375 |
| 2009/0076903 | A1 * | 3/2009 | Schwarzberg et al. | 705/14 |
| 2009/0204441 | A1 | 8/2009 | Read | |
| 2009/0204446 | A1 | 8/2009 | Simon | |

OTHER PUBLICATIONS

"Absenteeism Control"; Cole, Thomas C. et al; Management Decision; London: 1992. vol. 30, Iss. 2; p. 12 (AC).*
Attached images from archive.org of instant applicant's domain; labeled A-E.*
Consumer-Driven Health Plans Catch on as Myths Fall by Wayside. (Sep. 4). PR Newswire,1.*
Art Technology Group: Discovery Holdings to exploit online interest in healthcare & life assurance with ATG commerce functionality; Revenue potential significant as 70% of Discovery members access the Internet. (Oct. 28). M2 Presswire,1.*

(Continued)

*Primary Examiner* — Matthew Brooks
(74) *Attorney, Agent, or Firm* — Fleit Gibbons Gutman Bongini & Bianco, PL; Paul D. Bianco; Martin Fleit

(57) ABSTRACT

A system for managing absenteeism in an organization includes an absenteeism module to process absenteeism data relating to absenteeism of a person. A health module processes health data relating to the use of a plurality of health related facilities and/or services by the person. A reward determining module determines a reward for the person wherein the reward is determined based on the absenteeism of the person and on the use by the person of the plurality of health related facilities and/or services and a reward allocating module to allocate the reward to the person.

22 Claims, 2 Drawing Sheets

OTHER PUBLICATIONS

U.S. Appl. No. 12/112,165, RCE Response filed May 11, 2011.
U.S. Appl. No. 10/344,176, Office Action May 16, 2011.
U.S. Appl. No. 11/074,453, Requirement for Election May 23, 2011.
U.S. Appl. No. 12/303,388, Response Jun. 8, 2011.
U.S. Appl. No. 11/189,647, Final Office Action Jun. 22, 2011.
U.S. Appl. No. 12/333,465, Response filed Jun. 30, 2011.
U.S. Appl. No. 12/303,388, Final Office Action Jul. 5, 2011.
U.S. Appl. No. 12/477,225, Non Final Office Action Jul. 8, 2011.
U.S. Appl. No. 12/122,549, Response filed Jul. 21, 2011.

* cited by examiner

SYSTEM AND METHOD OF MANAGING ABSENTEEISM IN AN ORGANIZATION

BACKGROUND OF THE INVENTION

The present application relates to a system and method of managing absenteeism in an organization.

The present invention may be implemented by a traditional health insurance plan operator for its members or may be implemented by another party with an interest in reducing absenteeism in an organization.

The method and system will be described with reference to employees in a workplace although it will be appreciated that the method and system could equally be applied to people in other organizations.

Typically, employees in a workplace are given, for a predetermined period, a number of days of vacation leave which are used for their own personal benefit, a number of days of sick leave which are to be used when the employee is sick and possibly a number of days of family responsibility leave which can be used to attend to family responsibilities.

It is the sick leave which requires particular attention as although an employee is allowed a number of days of sick leave for a given period, having the employee sick and not in the office is not beneficial for the employer. The problem is compounded for employers of a large number of employees where absenteeism costs the employer a significant loss of productivity.

A method of addressing this is therefore required.

SUMMARY OF THE INVENTION

According to one example embodiment, a method of managing absenteeism in an organization, the method including:
  processing absenteeism data relating to absenteeism of a person;
  processing health data relating to the use of a plurality of health related facilities and/or services by the person;
  determining a reward for the person wherein the reward is determined based on the absenteeism of the person and on the use by the person of the plurality of health related facilities and/or services; and
  allocating the reward to the person.

The person may be an employee and the organization an employer.

The plurality of health-related facilities and/or services may include at least one of the group consisting of membership of health clubs, membership of gymnasiums, membership of fitness programs, weight loss programs and programs to quit smoking.

The plurality of health-related facilities and/or services may further include predetermined preventive medical procedures.

The plurality of health-related facilities and/or services may also further include a medical advice service and predetermined procedures, for example at least one of the group consisting of advance pre-authorization of hospitalization, advance pre-authorization of treatment, registration for electronic funds transfer and compliance with preferred procedures.

The monitoring absenteeism of the employee may include monitoring the number of days that the employee is absent due to illness.

In one example, the reward is determined whereby the lower the number of days that the employee is absent due to illness, the greater the reward.

The reward may also be determined by the higher the use by the employee of the plurality of health related facilities and/or services, the greater the reward.

The reward may be one or more additional days of vacation leave awarded to the employee.

The reward allocated to the employee may include at least one of the group consisting of: a financial reward; prizes allocated on the basis of a draw, access to health-related facilities and/or services for family members; decreased medical insurance premium payments according to a predetermined scheme; and increased medical insurance benefit payments according to a predetermined scheme.

According to another example embodiment there provided an electronic system for managing absenteeism in an organization, the system including:
  an absenteeism module to process absenteeism data relating to absenteeism of a person;
  a health module to process health data relating to the use of a plurality of health related facilities and/or services by the person;
  a reward determining module to determine a reward for the person wherein the reward is determined based on the absenteeism of the person and on the use by the person of the plurality of health related facilities and/or services; and
  a reward allocating module to allocate the reward to the person.

The person may be an employee and the organization an employer.

The health module may process health data wherein the plurality of health-related facilities and/or services includes at least one of the group consisting of membership of health clubs, membership of gymnasiums, membership of fitness programs, weight loss programs and programs to quit smoking.

The health module may further process health data wherein the plurality of health-related facilities and/or services further includes predetermined preventive medical procedures.

In addition, the health module may process health data wherein the plurality of health-related facilities and/or services also further includes a medical advice service and predetermined procedures, for example at least one of the group consisting of advance pre-authorization of hospitalization, advance pre-authorization of treatment, registration for electronic funds transfer and compliance with preferred procedures.

The absenteeism module may monitor the number of days that the employee is absent due to illness.

In one example, the reward determined by the reward determining module is determined whereby the lower the number of days that the employee is absent due to illness, the greater the reward.

The reward determined by the reward determining module may also be determined by the higher the use by the employee of the plurality of health related facilities and/or services, the greater the reward.

The reward may be one or more additional days of vacation leave awarded to the employee.

The reward allocating module may allocate a reward to the employee which may include at least one of the group consisting of: a financial reward; prizes allocated on the basis of a draw, access to health-related facilities and/or services for family members; decreased medical insurance premium payments according to a predetermined scheme; and increased medical insurance benefit payments according to a predetermined scheme.

A machine-readable medium embodying instructions which, when executed by a machine, cause the machine to perform a method including:

processing absenteeism data relating to absenteeism of an person;

processing health data relating to the use of a plurality of health related facilities and/or services by the person;

determining a reward for the person wherein the reward is determined based on the absenteeism of the person and on the use by the person of the plurality of health related facilities and/or services; and allocating the reward to the person.

The person may be an employee and the organization an employer.

DESCRIPTION OF THE PREFERRED EMBODIMENTS

Figure 1:
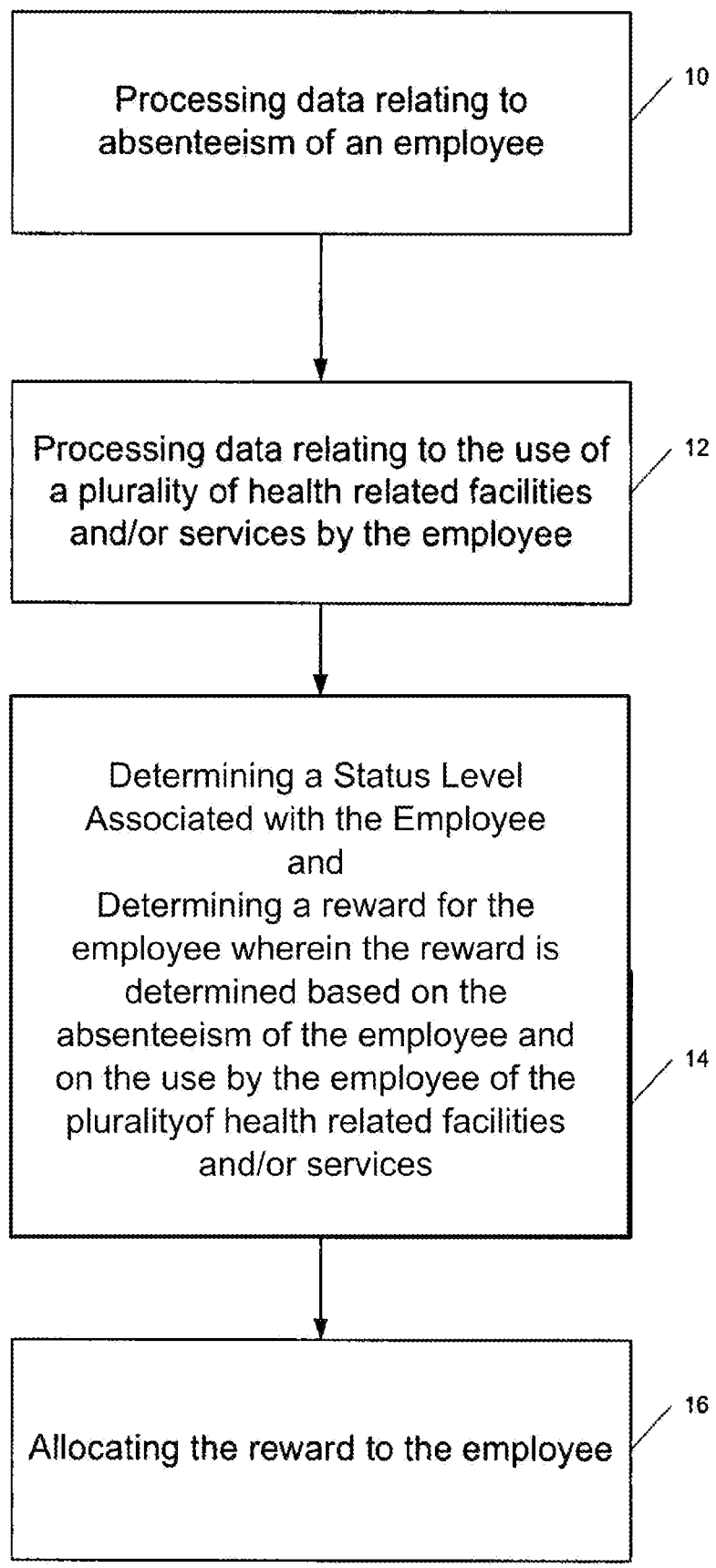
FIG. 1 is a flow chart illustrating the methodology of an example embodiment.

The systems and methodology described herein relate to a system and method of managing absenteeism in an organization.

The method and system will be described with reference to employees in a workplace although it will be appreciated that the method and system could equally be applied to people in other organizations.

It will also be appreciated that the system and methodology may be implemented by any relevant person or organization. For example, the system and methodology may be operated by the organization which is the employer of the employees in question.

Alternatively, the system and methodology may be operated by a third-party consultant to the employer of the employees in question.

For purposes of illustration, the system and methodology will be described herein as being operated by the managers of a health insurance plan.

Thus, one example application for the system and method described herein may be in the field of managing the business and operation of a health insurance plan. Typically, the insurer of such health insurance plans undertakes liability in return for a premium or contribution, and insures members who pay such premiums or make such contributions (or for whom such premium or contribution is paid by the member's employer) for covered health services or manages a personal medical fund or any other similar fund governed by respective healthcare and tax legislation (contributed to by the member or the member's employer) from which covered health care expenses are paid.

In certain countries, such health plans are referred to as medical schemes or medical aid schemes.

There are various models of health plans. For example, in one model the health insurer pays for all of the member's health services in particular agreed categories up to a predetermined limit. This predetermined limit is the limit of the health insurer's liability.

In an alternative model, a member has a personal medical fund or medical savings account or any other similar fund governed by respective healthcare and tax legislation which is managed by the health insurer or third party administrator of the health plan, but which the member and/or the member's employer funds. Any health related claims made to the health insurer are then paid by the health insurer or third party administrator from this personal medical fund up to a predetermined amount. Only after the predetermined amount does the health insurer incur liability and pay for the covered health related costs up to another predetermined amount.

In this method, the member typically pays to the health insurer an amount comprised of a risk premium portion in return for which the insurer undertakes liability for covered health services and a fund portion which is credited to the balance of the member's personal medical fund or any other similar fund governed by respective healthcare and tax legislation. It is this fund portion which the insurer or third party administrator will first use to pay for certain itemised covered health related costs incurred by the member.

The system and method described herein finds application in both of these models, for example, as well as in other models of health plans which are used.

Referring to FIG. 1, a method of managing employee absenteeism in an organization includes monitoring absenteeism of an employee of the organization (block 10), monitoring the use of a plurality of health related facilities and/or services by the employee (block 12) and then determining a reward for the employee (block 14) wherein the reward is determined based on the absenteeism of the employee and on the use by the employee of the plurality of health related facilities and/or services.

The reward is allocated to the employee (block 16).

Typically, the absenteeism that is being monitored is the number of days that the employee is absent due to illness but any other type of absenteeism could also be monitored if required.

In one example, the reward is determined whereby the lower the number of days that the employee is absent due to illness, the greater the reward will be.

For example, if an employee is allocated a number of sick leave days in a given period but does not take them, they are rewarded with a percentage of the amount of sick leave days that they did not use given back to them as vacation leave. Thus, in one example, an employee entitled to 10 days sick leave per year may be allocated 20% of their unused sick leave days back as vacation leave days. If the employee does not take any sick leave then that they will be entitled to an additional 2 days vacation leave.

Although the reward allocated to the employee is described as an awarding of additional vacation leave, it will be appreciated that the reward could take another form. For example, the reward could be at least one of the group consisting of: a financial reward; prizes allocated on the basis of a draw; access to health-related facilities and/or services for family members; decreased medical insurance premium payments according to a predetermined scheme; and increased medical insurance benefit payments according to a predetermined scheme.

In the example embodiment, the reward is also determined by the use by the employee of the plurality of health related facilities and/or services, in which case, the greater the use by the employee of the plurality of health-related facilities and/or services, the greater the reward will be.

In this regard, the method may further include calculating a number of points earned by the member in an incentive program operated by the health insurer or third party administrator of the health insurance plan, wherein the number of points are used to determine the reward.

An example of such an incentive program is presently managed by the applicant which manages a traditional indemnity health insurance plan together with their so-called Vitality™ program disclosed in the applicant's co-pending U.S. patent publication Ser. No. 09/982,274, the contents of which are incorporated herein by reference.

The Vitality program rewards members for utilizing approved health related facilities and/or services. For example, members are rewarded for utilizing membership of health clubs, membership of gymnasiums, membership of fitness programs, weight loss programs and programs to quit smoking.

Members are also rewarded for using preventive medical procedures, medical advice services and predetermined procedures, for example, pre-authorization of hospitalization, advance pre-authorization of treatment, registration for electronic funds transfer and compliance with preferred procedures.

Members are rewarded by a points allocation system and depending on the total number of points allocated to a member, they fall within one of four statuses. In the implementation of the Vitality program, these statuses have been named in ascending order of value, blue, bronze, silver and gold. All members are placed initially in the blue status. Once a member has accumulated a predetermined number of points, his/her Vitality status is upgraded to the next appropriate level.

With the above in mind, the following is an example of a table used to calculate the reward.

| Vitality Statuses | Percentage of absenteeism allocated as reward |
| --- | --- |
| Blue | 10% |
| Bronze | 20% |
| Silver | 30% |
| Gold | 50% |

These percentages could obviously vary depending on a number of operational, competitive and commercial factors.

Using the above in an example leads to the following:

| Number of unused sick leave days | Vitality Status | Reward allocated |
| --- | --- | --- |
| 5 | Blue | 0.5 |
| 5 | Bronze | 1 |
| 9 | Silver | 3 |
| 10 | Gold | 5 |

It will be appreciated that the employee is incentivised to not only look after their health by making full use of the health-related facilities and/or services, but at the same time are incentivised not to be absent from work where it is not full justified.

Figure 2:
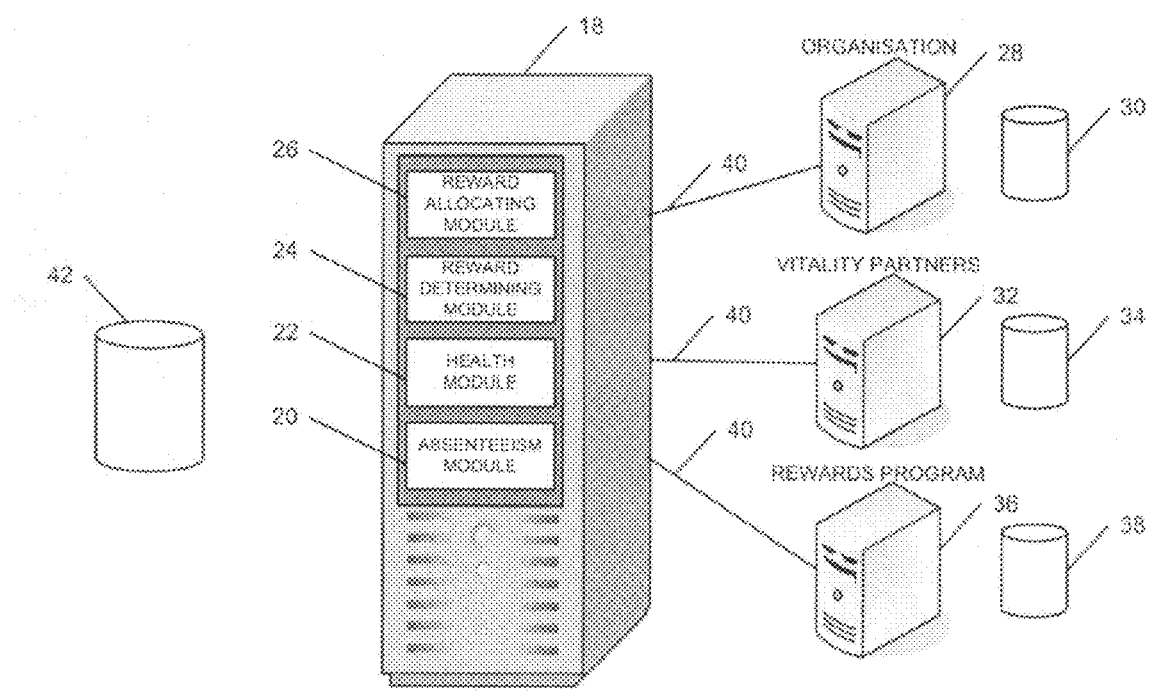
FIG. 2 is a block diagram illustrating an example system to implement the methodologies described herein.

FIG. 2 illustrates an exemplary system for implementing the above methodologies.

A server 18 includes a number of modules to implement the methodologies described above.

An absenteeism module 20 is used to process absenteeism data relating to absenteeism of an employee. The absenteeism data typically includes the number of days of sick leave that an employee is permitted to take for a predetermined period, for example a year, together with the number of days of sick leave that the employee actually took during that period. It will be appreciated that the processing of this absenteeism data, in one example, includes receiving the data input by a user or a human resources clocking system and storing the absenteeism data in a database 42.

In addition, the absenteeism data may be received from a server 28 of a third party organization with an associated database 30. In this example, the organization may be the organization that employs the employee and therefore in any event captures this data which simply needs to be uploaded to the absenteeism module 20.

A health module 22 processes health data relating to the use of a plurality of health related facilities and/or services by the employee. The health data typically includes the use that the employee is making of the health related facilities and/or services. It will be appreciated that the processing of this health data, in one example, includes receiving the data input by a user or an independent system and storing the health data in the database 42.

In addition, the health data may be received from a server 32 of a third party health partner with an associated database 34. In this example, the third party health partner may be the operator of a gymnasium or weight loss program, for example, that captures this data and uploads the data to the health module 22.

The health module 22, either independently or in conjunction with other modules, uses the health data to calculate the employee's Vitality status as has been described above.

A reward determining module 24 determines the reward for the employee wherein the reward is determined based on the absenteeism of the employee and on the employee's Vitality status, as described above.

A reward allocating module 26 allocates the reward to the employee.

Where the reward is additional days of vacation leave, this information is typically transmitted to the organization which employs the employee.

In certain instances where the organization which employs the employee does not wish to directly take part in the program, the operator of the medical insurance scheme may financially remunerate the organization for the loss of productivity thereby effectively buying the leave for the employee.

The system may include a database 42 for storing information to allow the methodologies to be implemented.

The modules described above may be implemented by a machine-readable medium embodying instructions which, when executed by a machine, cause the machine to perform any of the methods described above.

It will be appreciated that embodiments of the present invention are not limited to such architecture, and could equally well find application in a distributed, or peer-to-peer, architecture system. Thus the modules illustrated could be located on one or more servers operated by one or more institutions.

The invention claimed is:

1. A computer implemented method of managing absenteeism in an organization, the computer implemented method comprising:
    performing with a computer processor the following:
    processing absenteeism data relating to absenteeism of a person;
    processing health data relating to a use of a plurality of health related facilities and/or services by the person as provided by a wellness program;
    determining a status level associated with the person in the wellness program, wherein the status level is associated with the person based on a given number of points allocated to the person in response to the person using the plurality of health related facilities and/or services provided by the wellness program;
determining a reward for the person wherein the reward is determined based on the absenteeism of the person and on the status level associated with the person in the wellness program that has been determined; and
allocating the reward to the person.

2. The computer implemented method according to claim 1, wherein the person is an employee and the organization an employer.

3. The computer implemented method according to claim 1 wherein the plurality of health-related facilities and/or services include at least one of
membership of health clubs,
membership of gymnasiums,
membership of fitness programs,
weight loss programs, and
programs to quit smoking.

4. The computer implemented method according to claim 3, wherein the plurality of health-related facilities and/or services further includes predetermined preventive medical procedures.

5. The computer implemented method according to claim 4, wherein the plurality of health-related facilities and/or services further includes a medical advice service and predetermined procedures.

6. The computer implemented method according to claim 5, wherein the predetermined procedures include at least one of:
advance pre-authorization of hospitalization,
advance pre-authorization of treatment,
registration for electronic funds transfer, and
compliance with preferred procedures.

7. The computer implemented method according to claim 1, wherein processing absenteeism of the person includes monitoring a number of days that the person is absent due to illness.

8. The computer implemented method according to claim 1, wherein the reward is determined whereby a lower number of days that the person is absent due to illness has a greater reward than a higher number of days that the person is absent.

9. The computer implemented method according to claim 1, wherein the reward is determined whereby a higher use by the person of the plurality of health related facilities and/or services has a greater reward than a lower use by the person of the plurality of health related facilities and/or services.

10. The computer implemented method according to claim 1, wherein the reward is one or more additional days of vacation leave awarded to the person.

11. The computer implemented method according to claim 1, wherein the reward allocated to the person includes at least one of:
a financial reward;
prizes allocated on a basis of a draw, access to health-related facilities and/or services for family members;
decreased medical insurance premium payments according to a predetermined scheme; and
increased medical insurance benefit payments according to a predetermined scheme.

12. An electronic system for managing absenteeism in an organization, the system comprising:
a memory; and
a processor comprising:
an absenteeism module to process absenteeism data relating to absenteeism of a person;
a health module to
process health data relating to a use of a plurality of health related facilities and/or services by the person as provided by a wellness program, and
determine a status level associated with the person in the wellness program, wherein the status level is associated with the person based on a given number of points allocated to the person in response to the person using the plurality of health related facilities and/or services provided by the wellness program
a reward determining module to determine a reward for the person wherein the reward is determined based on the absenteeism of the person and on the status level associated with the person in the wellness program that has been determined; and
a reward allocating module to allocate the reward to the person.

13. The system of claim 12, wherein the health module processes health data relating to the plurality of health-related facilities and/or services including at least one of:
membership of health clubs,
membership of gymnasiums,
membership of fitness programs,
weight loss programs, and
programs to quit smoking.

14. The system of claim 13, wherein the health module further processes health data relating to the plurality of health-related facilities and/or services further including predetermined preventive medical procedures.

15. The system of claim 13, wherein the health module further processes health data relating to the plurality of health-related facilities and/or services further including a medical advice service and predetermined procedures.

16. The system of claim 12, wherein the absenteeism module monitors a number of days that the person is absent due to illness.

17. The system of claim 12, wherein the reward determined by the reward determining module is determined whereby a lower number of days that the person is absent due to illness has a greater reward than a higher number of days that the person is absent.

18. The system of claim 12, wherein the reward determined by the reward determining module is also determined whereby a higher use by the person of the plurality of health related facilities and/or services has a greater reward than a lower use by the person of the plurality of health related facilities and/or services.

19. The system of claim 12, wherein reward is one or more additional days of vacation leave awarded to the person.

20. The system of claim 12, wherein the reward allocating module allocates a reward to the person which includes at least one of:
a financial reward;
prizes allocated on a basis of a draw, access to health-related facilities and/or services for family members;
decreased medical insurance premium payments according to a predetermined scheme; and
increased medical insurance benefit payments according to a predetermined scheme.

21. A machine-readable medium embodying instructions which, when executed by a machine, cause the machine to perform a method comprising:
processing absenteeism data relating to absenteeism of a person;

processing health data relating a use of a plurality of health related facilities and/or services by the person as provided by a wellness program;

determining a status level associated with the person in the wellness program, wherein the status level is associated with the person based on a given number of points allocated to the person in response to the person using the plurality of health related facilities and/or services provided by the wellness program;

determining a reward for the person wherein the reward is determined based on the absenteeism of the person and on the status level associated with the person in the wellness program that has been determined; and allocating the reward to the person.

22. The system of claim 15, wherein the predetermined procedures comprise at least one of:
advance pre-authorization of hospitalization,
advance pre-authorization of treatment,
registration for electronic funds transfer, and
compliance with preferred procedures.

* * * * *